Patented Oct. 13, 1953

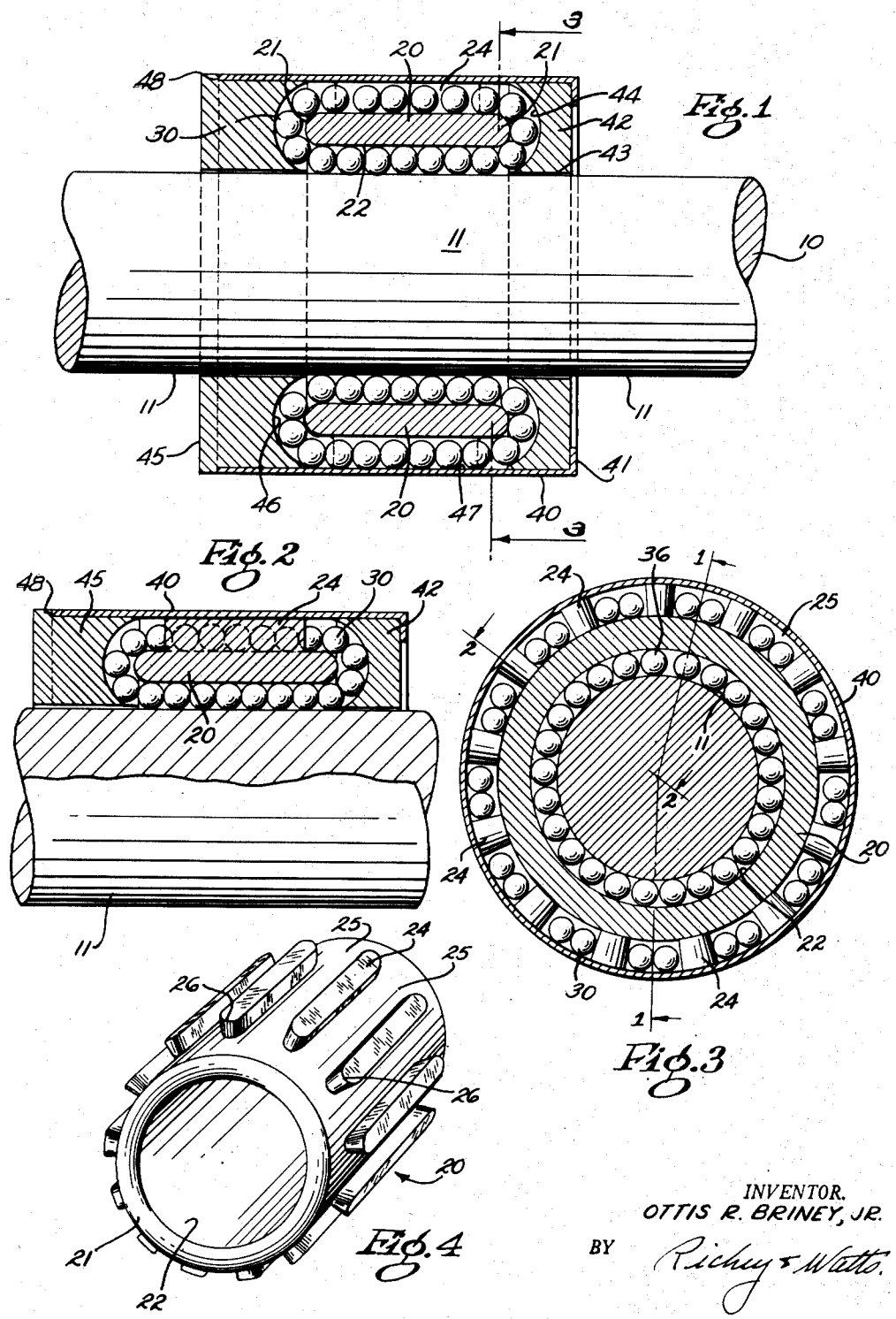

2,655,415

UNITED STATES PATENT OFFICE 2,655,415

BALL BEARING

Ottis R. Briney, Jr., Pontiac, Mich., assignor of one-half to James W. Briney

Application October 14, 1948, Serial No. 54,485

2 Claims. (Cl. 308—6)

This invention in a particular sense relates to anti-friction bearings for shafts, and the like, to permit longitudinal as well as rotary motion of the moving part.

In a broader sense, the invention is directed to improvements in machines of a character in which such bearings may be used, as, for example, precision boring tools. Such machines ordinarily include a spindle which is rotated and reciprocated to generate cylindrical surfaces. The precision of the cylindrical surface is dependent upon the consistency of position of the spindle axis.

My Patent No. 2,311,815 and my copending application Serial No. 53,000, filed October 6, 1948, illustrate solutions of the problem of mounting a spindle for prime axial and radial motion. The organization of parts constituting the present invention offers a highly significant advantage over the aforesaid inventions in that it provides a more compact structure which is susceptible of application in environs impressed with lineal restrictions. The previously disclosed inventions utilized a cylindrical outer ball race, the spindle constituting the inner race, and a sleeve or ball separator which moved longitudinally of the bearing relative to the stationary outer race to accommodate axial movement of the spindle.

The present invention eliminates the movable bearing separator of the previous inventions and thus accommodates the use thereof in more restricted assemblage. Moreover, in the present invention, regardless of the fact that the bearing itself is relatively short, there is no limit to the axial travel of the spindle.

The principal objects of the invention are to support members for rotation about an axis and for lineal movement along the axis; to provide a compact precision anti-friction bearing admitting substantially unlimited longitudinal and rotary movement; and to provide a bearing particularly suitable for rotary spindles of precision metalworking machines.

The manner in which the stated objects of the invention are realized, as well as certain more or less ancillary objects and advantages of the invention, will be apparent to those skilled in the art from the appended description of the preferred embodiment of the invention.

Referring to the drawings:

Fig. 1 is a longitudinal section of a bearing according to the invention taken on the plane indicated in Fig. 3;

Fig. 2 is a partial longitudinal section of the same taken on the plane indicated in Fig. 3;

Fig. 3 is a transverse sectional view taken on the plane indicated by the line 3—3 in Fig. 1; and Fig. 4 is a view in cabinet projection of a bearing race and guide.

The bearing illustrated in the drawings supports a shaft 10 which constitutes the inner race 11 of the bearing, and is hardened, ground, and lapped to form an accurate cylindrical body. The outer or stationary race of the bearing is formed by a ring 20 which, as shown, is formed with cylindrical inner and outer surfaces and with rounded end walls 21. The inner surface 22 of the ring 20, which constitutes the bearing face for the balls is ground and lapped to afford snug engagement of the balls intermediate the shaft 10 and face 22.

Movement of the shaft 10 with respect to the race 20 is accommodated by a rather large number of bearing balls 30 which substantially fill the cylindrical opening between the outer race 20 and the shaft 10 and provide an anti-friction mounting of the shaft on the outer race. As will be apparent, the shaft 10 is supported by the balls, and rotation thereof is afforded by the rolling movement of the balls over the surface of the shaft and around the bore of the outer race. Longitudinal movement of the shaft is accommodated by rolling of the balls about axes perpendicular to that of the shaft. Concurrent rotary and axial movement of the shaft is permitted by a composite movement of the balls.

The balls 30 not only substantially fill the opening between the races 11 and 22, but also substantially fill a cage within which the balls are received from one end of the race 22 and returned to the other end thereof under the influence of the axial movement of the shaft 10. While the cage may be constructed in various forms, the preferred form comprises an outer cylindrical shell or sleeve 40, which is normally mounted in a cylindrical bore in the machine so as to support the spindle in a manner essentially the same as the mounting of the outer race or sleeve of a conventional bearing. The outer shell 40 is formed with an inwardly directed flange 41 at one end thereof. An end ring 42 is fitted in the shell 40 against the flange 41 and is formed with a bore 43 machined for clearance over the shaft 10. The ring 42 is formed with a groove 44 in the inner face thereof which is configured in the form of a surface of revolution generated by the rotation of an arc about the medial axis of the bearing. The width and depth of the groove, as will be seen in Fig. 1, is approximately concentric with the rounded end surface 21 of the bearing race. The groove 44 of the end ring 42 thus constitutes a guiding surface for the balls as they pass around the end of the outer race. The ring 42 is preferably mounted in light press-fit relation with the sleeve 40.

A second end ring 45, bored for clearance over the race 11, is fitted in the open end of the shell 40, and is formed with an inner groove 46 of the same configuration as the face 44 of the ring 42 and similarly disposed with respect to the end of the race 20. The inner surface 47 of the shell 40 likewise constitutes a portion of the cage for the idle bearing balls which, as will be apparent from Fig. 1, are disposed between the race 20 and the surfaces 44, 46, and 47 which provide an annular recess in said cage. The end ring 45 is snugly engaged in the sleeve and may be located by a shoulder 48 on the end of the ring 45 abutting the end of the shell 40.

The bearing race 20 is supported in the shell 40 by longitudinal ribs 24 which are preferably somewhat shorter than the race and ground circumferentially to provide a light press-fit within the shell 40. As will be seen in Fig. 3, the voids 25 between the ribs 24 constitute passageways within which the idle bearing balls are retained and through which they pass during the cyclic movement thereof consequent the longitudinal movement of the shaft. The passageways 25 are preferably of a width which will accommodate two balls side by side with liberal radial and circumferential clearance. It will be understood that the number of ribs may be varied in accordance with the size of the bearing and the character of service.

The ends of the ribs 24 are chamfered or rounded, as illustrated most clearly at 26 in Fig. 4, so that balls engaging the ends of the ribs will be readily deflected to one side or the other into the passageways 25.

The bearing may be assembled by first pressing the end ring 42 and the race 20 into the position in the shell 40, inserting the shaft or a temporary inner race, filling the bearing with balls, and then sliding the ring 45 into place. The ring 45 may be retained, either by the shell 40 or by the bearing-supporting structure.

The clearance between the races 11 and 22 is dictated by the size of the ball and the type of service. Ordinarily, for a precision bearing, the dimension between the inner and outer races is slightly less than the diameter of the balls. The clearance between the races, however, is not considered to be a matter of particular significance with respect to the invention of this application. The clearance between the race ring 20 and the surfaces 44 and 46 of the end rings and the ring 20 and the inner surface 47 of the outer shell is preferably slightly in excess of the diameter of the balls to facilitate free movement of the balls.

The operation of the bearing will be apparent from the above description of the structure, but it may be pointed out that rotary movement of the shaft is accommodated by rolling of the balls between the races 11 and 22, the remaining balls taking no part in this phase of operation except that the balls adjacent the end rings may be carried around the bearing to some extent. If the shaft is moved longitudinally, the balls will roll along the inner surface of the race 22, thence outwardly and along one end ring, through the passageways 25, then inwardly along the surface of the other end ring. The translation and rotation of the balls may, of course, occur simultaneously. The bearing is filled with balls to an extent that permits slight spacing between the balls but insures the substantial filling of the voids between the two races so that ample support of the shaft 10 is always assured.

As will be apparent, the axial movement of the shaft 10 is limited only by the length of the race 11 and does not require any great axial length of the bearing per se.

While the principles of the invention have been conceived in response to the problem of precision bearings for machine tool spindles and the like, it will be apparent that the principles of the invention may be employed in less demanding situations and, in such cases, the precision of the construction may be reduced. Although the inner race as illustrated constitutes the outer surface of the shaft 10, it will be apparent that any body such as a hollow shell of cylindrical form may be employed to form the inner race.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:
1. An anti-friction bearing to accommodate rotative and axial movement of a shaft, comprising a ball cage having a bore therein, a shaft in said bore, said cage having an annular recess therein intermediate the ends thereof, a tubular ring disposed in spaced relationship with the shaft, ribs on the outer face of the ring engaged with the inner wall of the recessed portion of said cage, the walls defining the ends of said recess having annular grooves therein constituting passageways connecting the voids between the ribs with the void between the tubular ring and shaft, and balls arranged to roll within said passageways, the voids, and against each other.

2. An anti-friction bearing for a rotatable axially movable shaft comprising a ball cage, a shaft therein, a cylindrical ball race intermediate said shaft and said cage and spaced therefrom, ribs defining passageways on the outer face of said race supporting said race concentrically within said cage, the end walls of said cage having an annular recess in each end thereof constituting channels, and a plurality of balls completely filling the space between the shaft, said race, said channels and said passageways.

OTTIS R. BRINEY, Jr.

References Cited in the file of this patent

UNITED STATES PATENTS

| Number | Name | Date |
|---|---|---|
| 782,347 | Lidback | Feb. 14, 1905 |
| 1,094,972 | Bacorselski | Apr. 28, 1914 |
| 2,451,359 | Schlicksupp | Oct. 12, 1948 |
| 2,493,342 | Eldred et al. | Jan. 3, 1950 |

FOREIGN PATENTS

| Number | Country | Date |
|---|---|---|
| 755,957 | France | 1933 |